United States Patent [19]

Dembeck

[11] 4,417,848

[45] Nov. 29, 1983

[54] CONTAINMENT SHELL FOR A FAN SECTION OF A GAS TURBINE ENGINE

[75] Inventor: Kurt M. Dembeck, Vernon, Conn.

[73] Assignee: United Technologies Corporation, Hartford, Conn.

[21] Appl. No.: 344,901

[22] Filed: Feb. 1, 1982

[51] Int. Cl.³ .................... F01D 25/24; F01D 5/20
[52] U.S. Cl. .................... 415/121 G; 415/174; 415/219 R; 415/200
[58] Field of Search .............. 415/9, 121 G, 174, 197, 415/219 R, 200; 416/174

[56] References Cited

U.S. PATENT DOCUMENTS

| 2,930,521 | 3/1960 | Koehring | 415/200 |
| 3,843,278 | 10/1974 | Torell | 415/174 |
| 4,349,313 | 9/1982 | Munroe et al. | 415/200 |

FOREIGN PATENT DOCUMENTS

| 682951 | 11/1952 | Canada . | |
| 17546 | 3/1980 | European Pat. Off. . | |
| 981476 | 1/1965 | United Kingdom . | |
| 1369229 | 10/1974 | United Kingdom . | |
| 1532815 | 11/1978 | United Kingdom . | |
| 1533551 | 11/1978 | United Kingdom . | |
| 2061389 | 5/1981 | United Kingdom . | |

*Primary Examiner*—Harvey C. Hornsby
*Assistant Examiner*—John T. Kwon
*Attorney, Agent, or Firm*—Gene D. Fleischhauer

[57] ABSTRACT

A fan case 30 which extends circumferentially about a fan rotor assembly 26 in a turbofan gas turbine engine 10 is disclosed. The fan case has a shell 66 outwardly of the rotor assembly for blocking the rotor blade 38 during a blade failure from penetrating the portion of the shell immediately outwardly of the rotor blade. The material of the shell increases in thickness in the axially rearward direction and has a maximum thickness rearward of a reference plane passing through the mid-chord point of the rotor blade.

8 Claims, 8 Drawing Figures

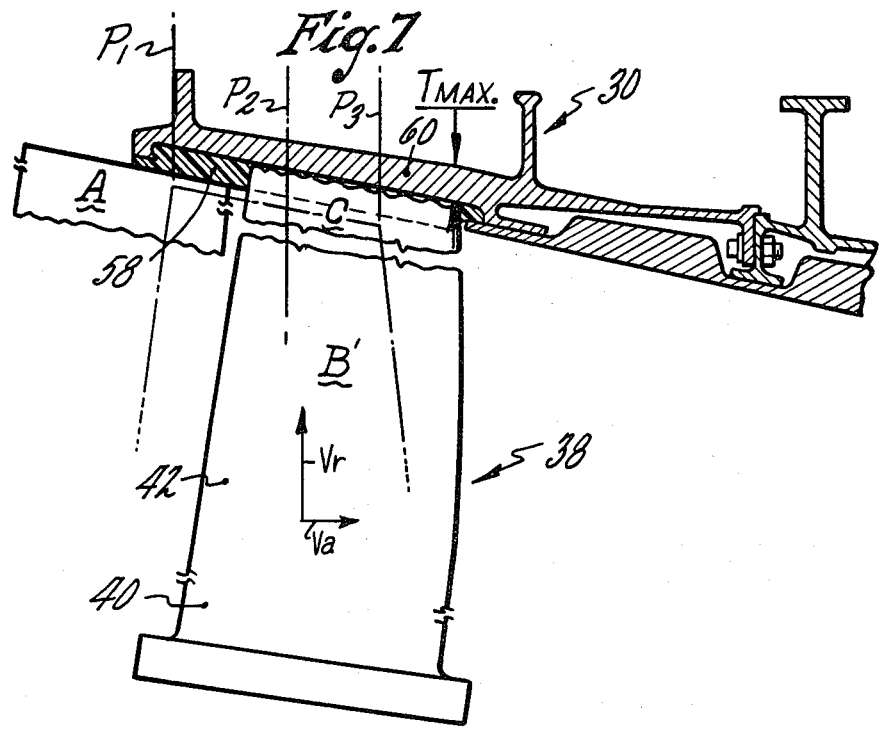
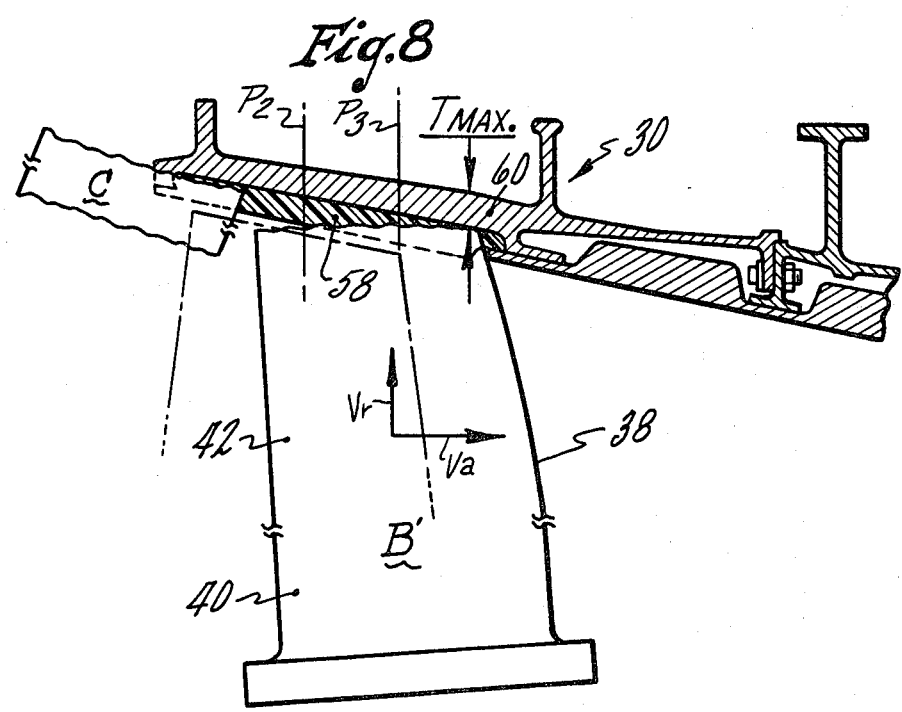

CONTAINMENT SHELL FOR A FAN SECTION OF A GAS TURBINE ENGINE

DESCRIPTION

1. Technical Field

This invention relates to a circumferentially extending shell for containing a fan blade during a failure of the fan blade. This invention is particularly directed at containment of a failed fan blade of a fan rotor assembly during the period of time the fan blade is in the plane of the fan rotor assembly.

2. Background Art

Turbofan engines having a high bypass ratio are commonly provided with a fan rotor assembly in the forward portion of the engine. The rotor assembly includes a rotor disk and fan rotor blades. The fan rotor blades extend outwardly from the disk across a primary flowpath for working medium gases and a secondary flowpath for working medium gases. These blades are more cambered and are considerably larger than are the blades of the axial flow compressors and turbines used in such engines.

The rotor blades are driven at high rotational speeds about an axis of rotation to provide the first stage of compression to the working medium gases. Foreign objects, such as birds, hailstones or other objects which are on occasion ingested into the engine along with the working medium gases may strike a blade and injure the blade to the extent that the blade fails in the region of attachment of the blade to the rotor disk. This region of attachment is called the root region. During such a failure in the root region, a rotor blade may be hurled outwardly from the rotor assembly with velocities of several hundred feet per second.

Because of the size, camber and rotational speeds of fan blades, fan blades present a different containment problem than do the smaller blades of the compressor and turbine sections of the engine. One device for providing containment in the planes of the rotor disk-blade assembly during such a failure is shown in U.S. Pat. No. 4,149,824 entitled "Blade Containment Device" issued to Adamson. Adamson shows a ring circumscribing the rotor blades. The ring is capable of spinning with respect to the outward support structure when struck by a rotor blade to absorb the rotational energy of the rotor blade.

A second device is shown in U.S. Pat. No. 4,197,052 issued to Lardellier entitled "Safety Device for an Axially Rotating Machine". Lardellier shows a containment shell formed with a helical ramp carried by the internal wall of the shell to deflect the bladed fragment from the plane of the blading.

These patents are illustrative of two different approaches for preventing the blade fragment from penetrating the containment shell during the period of time the blade is in the plane of the rotor disk-blade assembly. Notwithstanding this progress, scientists and engineers are seeking to develop other containment structures which block the passage of a failed rotor blade through the shell of the case.

DISCLOSURE OF INVENTION

The present invention is predicated on an analysis of experimental results developed during experimentation which employed experimental engines and high speed motion picture photography. The analysis developed in analytical model. The validity of the analytical model was confirmed with further experimentation and resulted in the present invention.

According to the present invention, the fan case of an axial flow, gas turbine engine has a shell extending circumferentially about an array of rotor blades which increases in thickness in the axially rearward direction and which has a maximum thickness rearward of a plane passing through the mid-chord point of the rotor blade to selectively reinforce the case against the impact of blade fragments.

In accordance with one embodiment, the maximum thickness of the shell is in a region bounded by a reference plane extending through the mid-chord point and a reference plane downstream of the trailing edge of the tip of the rotor blades a distance equal to the axial length of the tip.

A primary feature of the present invention is the containment shell of a fan case for an axial flow, gas turbine engine. The shell extends circumferentially about an array of rotor blades. Each rotor blade has a tip having a leading edge, a mid-chord point and a trailing edge. The shell has a radial thickness which increases in the axially rearward direction to a point of maximum thickness rearward of a reference plane which is perpendicular to the axis of the engine and which passes through the mid-chord point of the array of rotor blades. In one embodiment, the shell has a minimum thickness radially outwardly of the leading edge region of the rotor blade and a maximum thickness in a region extending between a plane passing through the mid-chord point of the blade and a plane passing through the trailing edge of the rotor blade. In another embodiment, the tip of the rotor blade has an axial length L between the leading edge and the trailing edge as measured in a plane containing the axis of the engine. The shell has a maximum thickness in a region lying between a reference plane passing through the mid-chord point of the blades and a reference plane passing through a point which is a distance L rearward of the trailing edge of the rotor blade. The thickness of the shell decreases in the axial rearward direction in a region rearward of the third plane. In one embodiment, the thickness incrementally changes in the rearward direction.

A principal advantage of the present invention is the increase in efficiency which results from containing fragments of rotor blades during the failure of a rotor blade in the root region of the blade with a case which is lighter in weight than those cases having a constant thickness by selectively increasing the thickness of the shell in selected regions and decreasing the thickness of the shell in other regions. Another advantage is the ease of manufacturing and assembling the containment shell which results from integrally forming the shell with the fan case of the engine.

The foregoing features and advantages of the present invention will become more apparent in the light of the following detailed description of the best mode for carrying out the invention and in the accompanying drawing.

BRIEF DESCRIPTION OF DRAWING

FIG. 7 is a schematic representation of the rotor blade piercing the rubstrip and striking the containment shell; and FIG. 8 is a schematic representation of the rotor blade striking the containment shell as the rotor blade is driven rearwardly by the following blade out of the fan rotor plane of the turbofan engine.

BEST MODE FOR CARRYING OUT THE INVENTION

Figure 1:
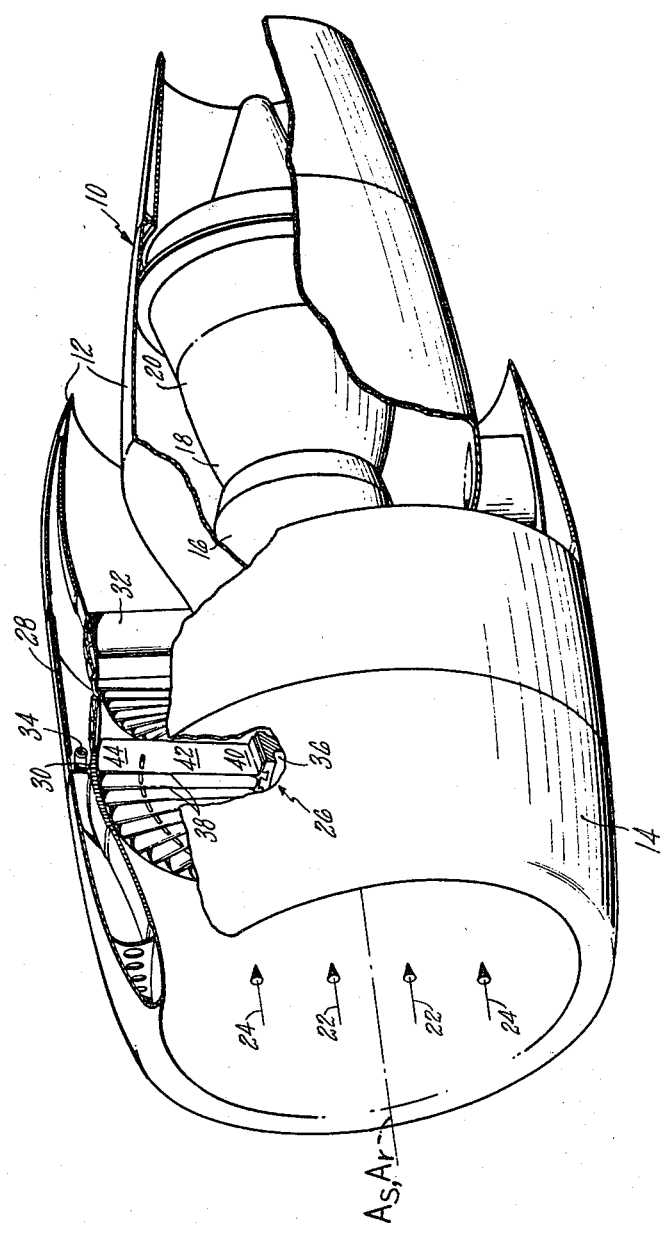
FIG. 1 is a perspective view of a turbofan gas turbine engine mounted in an aircraft nacelle with a portion of the nacelle and the engine broken away to show an array of fan rotor blades and the adjacent fan case structure in the engine.

A gas turbine engine 10 of the axial flow, turbofan type is shown in FIG. 1. A nacelle 12 circumscribes the engine and is adapted to both support and position the engine from a support structure such as an aircraft wing (not shown). The engine is formed of a fan section 14, a compressor section 16, a combustion section 18 and a turbine section 20. A primary flowpath 22 for working medium gases extends rearwardly through these sections. A secondary flowpath 24 for working medium gases extends rearwardly outwardly of the primary flowpath.

The fan section 14 includes a rotor assembly 26 having an axis of rotation Ar and a stator assembly 28. The stator assembly has an axially extending fan case 30 and an array of stator vanes such as the fan exit guide vanes 32. The case has an axis of symmetry As and forms an inner wall of the nacelle 12. Service components such as a duct 34 for anti-icing air and a starter (not shown) for starting the aircraft with compressed air are disposed radially outwardly of the fan case.

The rotor assembly 26 includes a rotor disk 36 and a plurality of rotor blades 38. Each rotor blade has a root region 40, a mid-span region 42 and a tip region 44. The rotor blades extend outwardly from the disk across the working medium flowpaths into proximity with the stator assembly.

Figure 2:
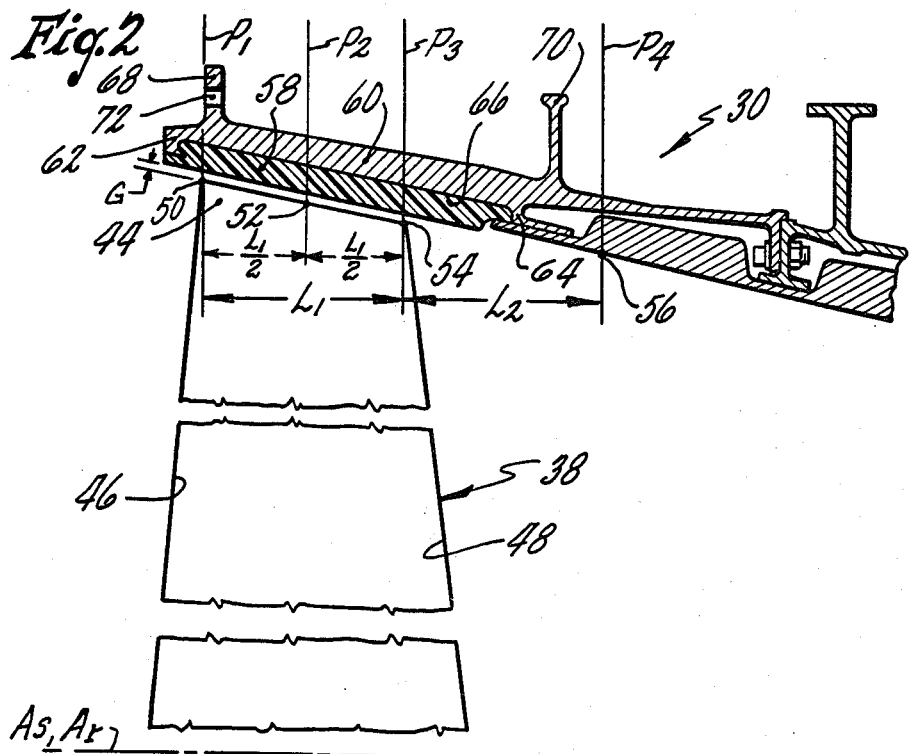
FIG. 2 is a cross-sectional view of the fan case structure adjacent the rotor blade and is a side elevation view of the rotor blade with portions of a rotor blade broken away.

FIG. 2 is an enlarged cross-sectional view of the stator assembly 28 showing the fan case 30 and one of the rotor blades 38 with portions of the rotor blade broken away. The rotor blade has a leading edge 46 and a trailing edge 48. At the tip 44 of the blade, the trailing edge is spaced axially a distance $L_1$ from the leading edge. The tip has a point 50 at the leading edge, a point 52 at the mid-chord and a point 54 at the trailing edge. The midchord point is axially spaced an equal distance from the leading edge and the trailing edge of the tip. A point 56 downstream of the trailing edge is spaced axially rearwardly a distance $L_2$ from the point on the trailing edge. The distance $L_2$ is equal to the distance $L_1$ ($L_2 = L_1$). Four reference planes, $P_1$, $P_2$, $P_3$, and $P_4$ are oriented with respect to these points on the fan rotor blade and are each perpendicular to the axis of symmetry of the fan case. Plane $P_1$ extends through the point 50 on the leading edge. Plane $P_2$ extends through the point 52 at the mid-chord of the airfoil tip. Plane $P_3$ extends through the point 54 on the trailing edge. Plane $P_4$ extends through the point 56 downstream of the rotor blade. Each rotor blade is spaced radially from the fan case 30 leaving a gap G therebetween.

The fan case 30 outwardly of the rotor blade 38 includes a rubstrip 58, a shell 60, a first flange 62 and a second flange 64. The flanges are integrally joined to the shell. The flanges extend inwardly from the shell to define a groove 66 which adapts the fan case to receive the rubstrip. The fan case has a third flange 68 and a fourth flange 70 integrally joined to the shell and extending outwardly from the shell. The third flange has a plurality of holes, as represented by the single hole 72, which adapt the flange to engage an adjacent structure. The fourth flange extends outwardly to affect the vibrational response of the fan case. These four flanges and the rubstrip are not considered portions of the shell for purposes of in-plane blade containment analysis of fan blade fragments and therefore are not analytically considered to improve the ability of the shell to withstand the impact of fragments of a fan blade during the failure of the fan blade.

Figure 3:
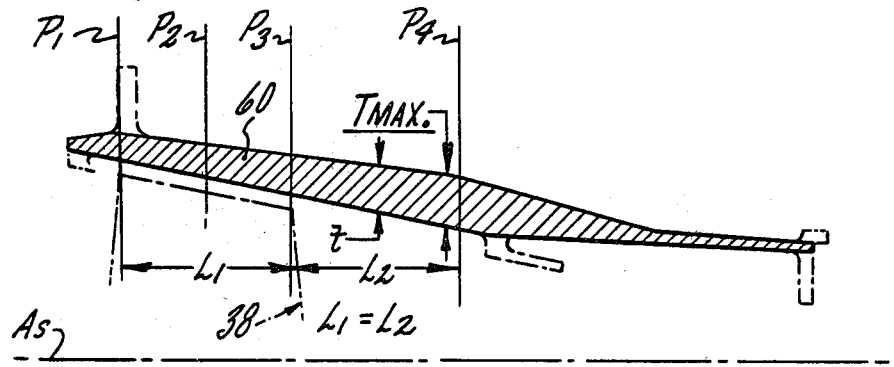
FIG. 3 is a diagrammatic cross-sectional view of a shell for providing containment of a rotor blade.
Figure 4:
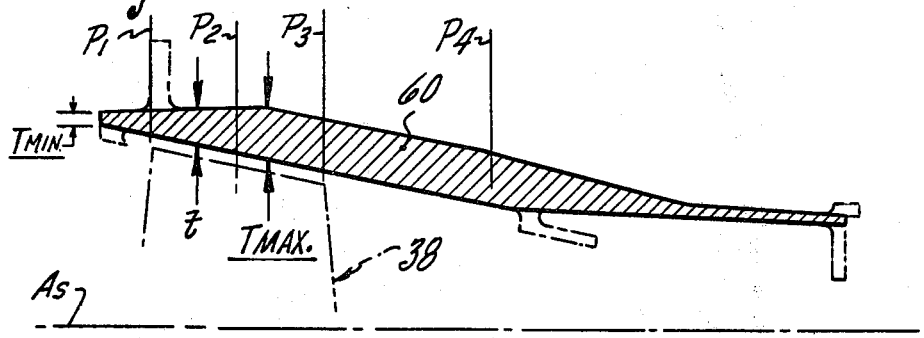
FIG. 4 is a diagrammatic cross-sectional view of an alternate embodiment of the containment shell shown in FIG. 3.
Figure 5:
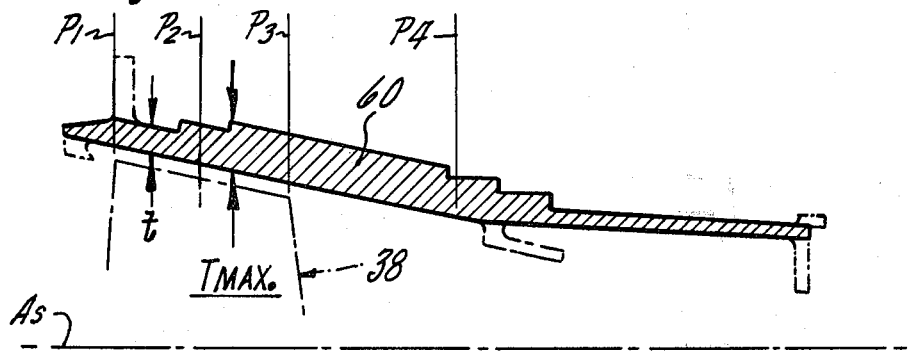
FIG. 5 is a diagrammatic cross-sectional view of an alternate embodiment of the containment shell shown in FIG. 3.

FIG. 3 is a diagrammatic cross-sectional view of the shell 60. FIGS. 4 and 5 are alternate embodiments of the diagrammatic view shown in FIG. 3. Each diagrammatic view has exaggerated length and thickness to illustrate the relationship between the reference planes $P_1$, $P_2$, $P_3$, $P_4$ and the radial thickness of material t of the shell. In FIG. 3, the shell has a thickness of material t in the radial direction which increases in the axially rearward direction to a maximum thickness rearward of the mid-chord plane $P_2$. FIG. 4 shows a shell having a thickness of material t in the radial direction which increases in the axially rearward direction. The thickness of material increases from a minimum thickness Tmin radially outward of the leading edge region to a maximum thickness Tmax in a region bounded by the mid-chord plane $P_2$ and the trailing edge plane $P_3$. In FIG. 5 the shell has a thickness of material t in the radial direction which increases in at least one nonuniform increment to a maximum thickness of material Tmax in a region lying between the mid-chord plane $P_2$ and the trailing edge plane $P_3$. In each of these embodiments the shell has a first, minimum thickness of material radially outwardly of the leading edge region of the rotor blade and a maximum thickness which is at least twenty percent (20%) greater than the first thickness. The maximum thickness of material of the shell occurs in a region lying between the mid-chord plane $P_2$ and the downstream plane $P_4$ which is spaced axially from the trailing edge a distance $L_2$.

During operation of the engine, the rotor assembly 26 shown in FIG. 1 rotates about the axis of rotation Ar art speeds as high as 4,000 revolutions per minute. As the rotor assembly rotates, the disk 36 exerts a centripetal force on the root region 40 of each blade causing the blade to follow a circular path about the axis of rotation Ar of the rotor assembly. An impact on the blade by a large foreign object during rotation may cause the blade to fail in the root region. The following description is illustrative of a typical interaction between the blade, the rubstrip 58 and the support shell 60 during such a blade failure. This description is not an exhaustive description of all possible interactions between the components during the blade failure.

Figure 6:
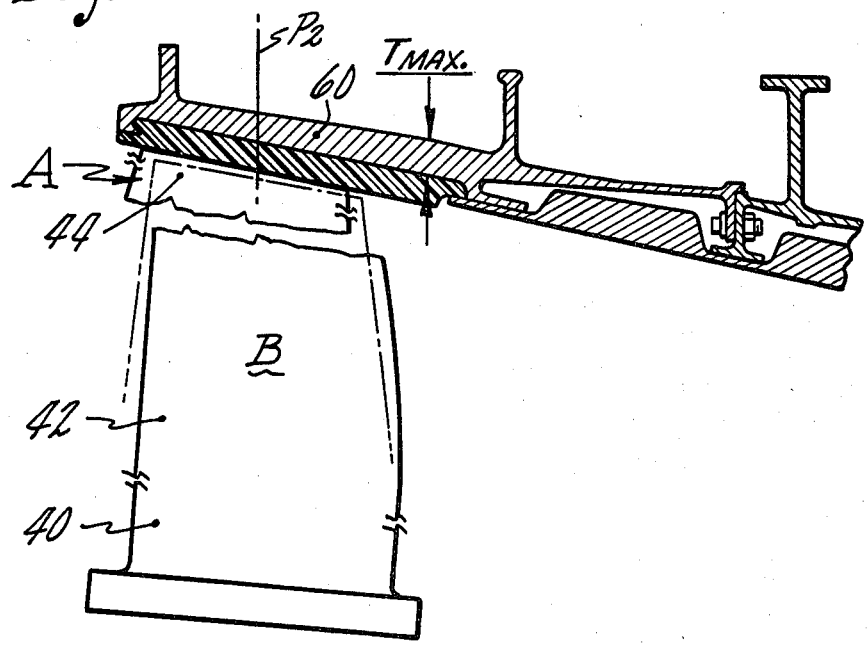
FIG. 6 is a schematic representation of a rotor blade during a blade root failure as it initially strikes a rubstrip carried by the containment shell.

As the fan blade fails, the fan blade 38 breaks in the root region and moves radially outwardly across the gap G between the tip region 44 and the rubstrip 54, strikes the rubstrip 58, and fragmentizes. As shown in FIG. 6, typically the tip region 44 (marked A) of the blade breaks off from the rotor blade during this first strike leaving behind the root region 40 and mid-span region 42 of the blade (marked B). The fragments of the tip region move forwardly with relatively high axial velocity because of the shape of the flowpath and because of the difference in pressure which exists between the leading edge and the trailing edge of the blade. The mid-span and base region of the blade forming the second portion B of the blade moves radially outwardly across the radial distance occupied by the tip region 44 and across the gap G.

As the second portion B of the fan blade 38 moves outwardly, the second portion of the blade is struck from behind by the adjacent (following) fan blade which is shown in phantom. The following fan blade accelerates the broken blade fragment B increasing the velocity of the blade fragment as the fragment slides radially outwardly along the following blade. The second portion B of the blade has an axial rearward component of velocity $V_a$ as as result of being struck by the following blade and because of this contact and the rotational energy of the blade, the second portion of the blade also has a radially outward component of velocity $V_r$. The larger size of the second portion of the blade and the increased velocity due to the impact of the following blade causes the second portion B of the blade to impact the rubstrip 58 with more energy than did the first strike of the blade. As shown in FIG. 7, the second impact results in the blade penetrating the rubstrip and striking the containment shell 60 at a location rearwardly of the first impact. The blade fragment C breaks off from the new tip of the blade and moves axially forwardly leaving behind the fragment B'.

As shown in FIG. 8, the second portion B' of the blade moves outwardly to strike the case a third time. During the third strike the remaining portion of the blade is thick enough so that the blade does not fragmentize at the tip. The blade portion B' is driven rearwardly by the following blade and because of this contact and the rotational energy of the blade, the second portion of the blade also strikes the containment shell with a greater impact than the first strike. The second and third strikes are of much larger magnitude than the first strike. The maximum energy transmitted to the containment shell occurs rearwardly of the first reference plane $P_2$ and forwardly of the plane $P_4$. The selective reinforcement of the case rearwardly of the plane $P_2$ increases the capability of the case to absorb energy and decreases the penalty in weight as compared with constructions having a constant thickness between plane $P_1$ and $P_4$. As shown in FIG. 8, the remaining blade portion B' is pushed rearwardly out of the plane of the rotor. The remaining blade portion impacts the case rearwardly one or more times with less force than in-plane strikes occurring between planes $P_2$ and $P_4$.

The remaining blade portion B is typically trapped aft of the rotor by the fan exit guide vanes 32 shown in FIG. 1.

Although the invention has been shown and described with respect to detailed embodiments thereof, it should be understood by those skilled in the art that various changes in form and detail thereof may be made without departing from the spirit and the scope of the claimed invention.

I claim:

1. In an axial flow gas turbine engine of the type having a fan case which includes a shell extending circumferentially about an array of fan rotor blades, and having an axis of symmetry As the improvement which comprises:

a shell having a thickness of material in the radial direction which increases in the axially rearward direction and which has a maximum thickness rearward of a plane $P_2$ perpendicular to the axis of symmetry As and passing through the mid-chord point of one of the rotor blades wherein the increasing thickness of the shell selectively increases the cross-sectional area of the case to reinforce the case against the impact of blade fragments.

2. The shell for a fan case of claim 1 wherein said rotor blade has a tip having a trailing edge, wherein a second plane $P_3$ extends through the trailing edge and extends perpendicular to the axis of symmetry As, and wherein a region bounded by the first plane $P_2$ and the second plane $P_3$ contains the maximum thickness of the shell.

3. The shell for a fan case of claim 1 wherein said rotor blade has a tip having a trailing edge wherein the trailing edge of said blade is spaced a distance L from the stacking line of the blade, wherein a second plane $P_4$ extends through a point rearwardly of the trailing edge a distance L and extends perpendicular to the axis of symmetry As to form a region extending between the first plane $P_2$ and the second plane $P_4$, wherein the maximum thickness of the shell is in said region.

4. The shell for a fan case of claims 1, 2 or 3 wherein the thickness of material increases at a constant rate in the axially rearward direction.

5. The shell for a fan case of claim 1 wherein the thickness of material increases in at least one non-uniform increment.

6. The shell of a fan case of claim 5 wherein the thickness of material increases in a plurality of steps.

7. The invention as claimed in claims 1, 2 or 3 wherein each rotor blade has a tip having a leading edge and wherein the shell has a first thickness radially outwardly of the leading edge region and has a maximum thickness which is at least twenty percent (20%) greater than the first thickness.

8. The fan case of claims 1, 2 or 3 wherein the rotor blade has a tip having a leading edge region and wherein a flange radially outwardly of the leading edge region extends from the shell.

* * * * *